United States Patent [19]

Prather et al.

[11] E Patent Number: Re. 31,703

[45] Reissued Date of Patent: Oct. 9, 1984

[54] PROCESS OF MAKING PARTICLE BOARD FROM PYROPHOSPHATE TREATED POLYISOCYANATES

[75] Inventors: Richard A. Prather; David L. Williams, both of Houston, Tex.; Robert M. Partin, Friendswood, Tex.; Warren J. Rabourn, deceased, late of Deer Park, Tex., by Hazel L. Rabourn, legal representative

[73] Assignee: The Upjohn Company, Kalamazoo, Mich.

[21] Appl. No.: 404,415

[22] Filed: Aug. 2, 1982

Related U.S. Patent Documents

Reissue of:

[64] Patent No.: 4,258,169
Issued: Mar. 24, 1981
Appl. No.: 134,219
Filed: Mar. 26, 1980

[51] Int. Cl.[3] ..... B29J 5/00; C08G 18/38; C08G 18/77

[52] U.S. Cl. ..... 264/109; 264/122; 264/123; 528/44; 528/51; 528/72

[58] Field of Search ..... 528/72, 51, 44; 264/109, 122, 123

[56] References Cited

U.S. PATENT DOCUMENTS

| | | | |
|---|---|---|---|
| 3,384,653 | 5/1968 | Erner et al. | 260/453 |
| 3,394,165 | 7/1968 | McClellan et al. | 260/453 |
| 3,428,592 | 2/1969 | Youker | 524/591 |
| 3,440,189 | 4/1969 | Sharp | 428/338 |
| 3,493,075 | 3/1970 | Fishbein et al. | 528/51 |
| 3,557,263 | 1/1971 | Marra | 428/425.1 |
| 3,636,199 | 1/1972 | Jenks et al. | 428/425.1 |
| 3,870,665 | 3/1975 | Diehr et al. | 524/9 |
| 3,919,017 | 11/1975 | Shoemaker et al. | 428/425.1 |
| 3,930,110 | 12/1975 | Shoemaker et al. | 428/425.1 |
| 3,943,075 | 3/1976 | Fishbein et al. | 528/51 |
| 4,005,034 | 1/1977 | Weil | 528/51 |
| 4,024,088 | 5/1977 | Godlewski | 521/107 |
| 4,100,328 | 7/1978 | Gallagher | 428/407 |
| 4,257,995 | 3/1981 | McLaughlin et al. | 528/75 |
| 4,257,996 | 3/1981 | Farrissey et al. | 528/75 |
| 4,258,169 | 3/1981 | Prather et al. | 528/51 |

FOREIGN PATENT DOCUMENTS 4661-8469 2/1971 Japan .

*Primary Examiner*—H. S. Cockeram
*Attorney, Agent, or Firm*—Denis A. Firth; John Kekich

[57] ABSTRACT

A process is disclosed for the preparation of liquid, storage-stable, polyisocyanate compositions containing a release agent formed in situ which compositions are useful, for example, as binder resins in the formation of particle boards which latter, because of the presence of the release agent, show no tendency to adhere to the face of metal platens used in their formation. The process comprises heating an organic polyisocyanate (polymethylene polyphenyl polyisocyanate preferred) with an acid phosphate (e.g. a mixture of mono- and di-alkyl acid phosphates) under conditions controlled as to time and temperature so as to yield a product which is storage stable and shows no tendency to deposit solid or to separate into two liquid phases.

13 Claims, No Drawings

PROCESS OF MAKING PARTICLE BOARD FROM PYROPHOSPHATE TREATED POLYISOCYANATES

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to polyisocyanate compositions and is more particularly concerned with storage stable liquid polyisocyanate compositions containing a release agent formed in situ, and with a method for the preparation of said compositions.

2. Description of the Prior Art

The use is known of organic polyisocyanates as binders, or as components of a binder, for the preparation of particle boards; see, for example, U.S. Pat. Nos. 3,428,592; 3,440,189; 3,557,263; 3,636,199; 3,870,665; 3,919,017 and 3,930,110.

In a typical process the binder resins, optionally in the form of a solution or aqueous suspension or emulsion, are applied to or admixed with particles of cellulosic or like material capable of being compressed into particle board, using a tumbler apparatus or blender or other form of agitator. The mixture of particles and binder is then formed into a mat and subjected to heat and pressure using heated platens. The process can be carried out in a batch operation or continuously. To avoid adhesion of the board so formed to the heated platens it has hitherto been necessary to interpose a sheet, impermeable to isocyanate, between the surface of the board and the platen during the forming process, or to coat the surface of the platen, prior to each molding operation, with an appropriate release agent or to coat the surface of the particles themselves with a material which will not adhere to the platen. Any of these alternatives, particularly where the process is being operated on a continuous basis, is cumbersome and a drawback to what is otherwise a very satisfactory method of making a particle board with highly attractive structural strength properties.

It has recently been found that the above drawbacks to the use of organic isocyanates as particle board binders can be overcome in a very satisfactory manner by incorporating certain phosphorus-containing compounds as internal release agents. These findings are disclosed in copending application Ser. No. 35,647 filed May 3, 1979 *abandoned, and in application Ser. No. 134,315, filed Mar. 26, 1980 as a continuation-in-part of said Ser. No. 35,647 and issued as U.S. Pat. No. 4,257,995.* Among the phosphorus-containing compounds which can be employed in accordance with the above findings are pyrophosphates derived from mono- and di-hydrocarbyl acid phosphates and related compounds. In accordance with the process described in the aforesaid pending application Ser. No. 35,647 the said pyrophosphates can be prepared separately by reacting the corresponding acid phosphates with dehydrating agents such as phosgene, phosphorus oxychloride and the like and, if desired, can then be mixed with the polyisocyanate for use in the formation of the particle boards. Alternatively, it is also disclosed in the aforesaid pending application that said pyrophosphates can be prepared by reaction with the dehydrating agent in the presence of the organic polyisocyanate.

We have now found that, by using very carefully controlled conditions, it is possible to prepare said pyrophosphates and related polyphosphates in situ in said organic polyisocyanates without the use of additional reagents such as the ecologically and toxicologically undesirable compounds phosgene, phosphorus oxychloride, and the like. We have further found that it is possible to prepare organic polyisocyanates which contain said pyrophosphates and related polyphosphates produced in situ and which possess the additional desirable characteristics of being liquid and storage-stable, i.e. they show no tendency to deposit solids or to separate into two liquid phases on storage for prolonged periods of time. This is in direct contrast to the behaviour of compositions made in a closely related manner but not observing the specific reaction conditions which are discussed in detail hereafter.

The ability to produce such liquid, storage-stable, polyisocyanate compositions greatly facilitates the utilization of polyisocyanates as particle board binders. Thus, it is possible thereby to provide the particle board manufacturer with a single composition, prepared in a highly economical manner, which can be utilized readily by the manufacturer in accordance with the process of the aforesaid Ser. No. 35,647. The polyisocyanate compositions prepared in accordance with this invention can be applied, either as such or as an aqueous emulsion or suspension, to the cellulosic or like particles which are subsequently molded, using heat and pressure, into particle boards. The latter, by reason of the pyrophosphate produced in situ in the compositions of the invention, release readily from the mold platens.

SUMMARY OF THE INVENTION

This invention comprises a process for preparing a liquid, storage-stable, polyisocyanate composition containing a mold release agent formed in situ, which process comprises heating, at a temperature in the range of about 60° C. to about 190° C., a mixture of an organic polyisocyanate and from about 1 to about 20 parts, per 100 parts by weight of said polyisocyanate, of an acid phosphate selected from the class consisting of acid phosphates having the formulae:

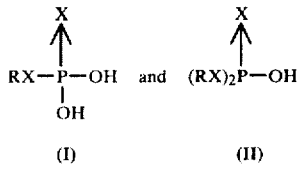

(I) (II)

and mixtures of two or more of said acid phosphates, wherein, in the above formulae, each R is independently selected from the class consisting of alkyl having at least 3 carbon atoms, alkenyl having at least 3 carbon atoms, aryl, aryl substituted by at least one alkyl group, alkyl substituted by at least one acyloxy group, wherein the acyl group is the residue of an aliphatic monocarboxylic acid having at least 2 carbon atoms, and

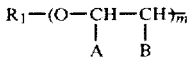

wherein $R_1$ is selected from the group consisting of alkyl, aryl, and aryl substituted by at least one alkyl, one of A and B represents hydrogen and the other is selected from the class consisting of hydrogen, methyl, and chloromethyl and 2,2,2-trichloroethyl; X is chalcogen selected from the class consisting of oxygen and sulfur; and m is a number having an average value of 1 to 25;

the said heating of said mixture being carried out for a time such that no phase separation occurs upon cooling the reaction mixture to an ambient temperature.

The invention also comprises the liquid, storage-stable, polyisocyanate compositions produced by the process set forth above as well as the use of said compositions as binders in the preparation of particle boards and like materials.

The term "alkyl having at least 3 carbon atoms" means a saturated monovalent aliphatic radical, straight chain or branched chain, which has the stated minimum number of carbon atoms in the molecule. Illustrative of such groups are propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, pentacosyl, hexacosyl, heptacosyl, octacosyl, nonacosyl, triacontyl, pentatriacontyl, and the like, including isomeric forms thereof. The term "alkyl" when used without the above carbon atom limitation is also inclusive of methyl and ethyl.

The term "alkenyl having at least 3 carbon atoms" means a monovalent straight or branched chain aliphatic radical containing at least one double bond, and having the stated minimum number of carbon atoms in the molecule. Illustrative of such groups are allyl, butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, eicosenyl, heneicosenyl, docosenyl, tricosenyl, pentacosenyl, triacontenyl, pentatriacontenyl, and the like, including isomeric forms thereof.

The term "aryl" means the monovalent radical obtained by removing one nuclear hydrogen atom from an aromatic hydrocarbon. Illustrative of aryl are phenyl, naphthyl, biphenylyl, triphenylyl and the like. The term "aryl substituted by at least one alkyl" means an aryl radical, as above defined, carrying at least one alkyl (as above defined) substituent. Illustrative of such are tolyl, xylyl, butylphenyl, octylphenyl, nonylphenyl, decylphenyl, decyltolyl, octadecylphenyl and the like.

The term "aliphatic monocarboxylic acid having at least 2 carbon atoms" is inclusive of any alkanoic or alkenoic acid having the stated minimum number of carbon atoms. Illustrative of such acids are acetic, propionic, butyric, hexanoic, octanoic, lauric, stearic, oleic, undecylenic, dodecylenic, isocrotonic, palmitic, and the like.

Each of the groups R and $R_1$ in the formulae (I) and (II) set forth above can optionally be substituted by one or more inert substituents, i.e. substituents which do not contain active hydrogen atoms and which are therefore unreactive in the presence of the polyisocyanate. Illustrative of such inert substituents are alkoxy, alkylmercapto, alkenyloxy, alkenylmercapto, chloro, bromo, iodo, fluoro, cyano and the like.

DETAILED DESCRIPTION OF THE INVENTION

We have found that it is possible to convert acid phosphates, having the formula (I) and (II) above, to a product containing the corresponding pyrophosphates by heating said acid phosphates in the presence of an organic polyisocyanate without the need to utilize any other reactant such as phosphorus oxychloride, phosgene, and the like. We have also found, however, that the reaction will give rise to a useful product, namely one which is a homogeneous liquid and which can be stored for prolonged periods without any tendency to undergo phase separation, only if the conditions of heating are carefully controlled.

The fact that there are any conditions at all which could lead to the formation of such a useful product is itself to be considered as surprising to one skilled in the art. Thus, the reaction of an acid phosphate of the type shown in formulae (I) and (II) with an organic isocyanate would be expected to proceed in accordance with the following equation in which R has the significance defined above and R' represents the residue of the organic isocyanate, which latter is shown as monomeric for the sake of simplicity:

$$2(RO)_2\overset{\overset{\displaystyle O}{\uparrow}}{P}-OH + R'NCO \longrightarrow \underset{\text{(III)}}{(RO)_2\overset{\overset{\displaystyle O}{\uparrow}}{P}-O-\overset{\overset{\displaystyle O}{\uparrow}}{P}(OR)_2} + \underset{\text{(IV)}}{CO_2 + R'NH_2}$$

The reaction results in the formation of the desired pyrophosphate in association with some polyphosphate. The reaction also gives rise to the intermediate formation of the amine (IV) corresponding to the starting isocyanate. The amine (IV) would react immediately with additional isocyanate to form a urea. In the case of the use of a polyisocyanate the result would be the formation of a polyurea which normally would be insoluble in the reaction product and would separate as a solid either immediately or on standing.

This is indeed what is found to happen when the reaction between the acid phosphate (I) or (II) is reacted with the organic polyisocyanate at any temperature below about 60° C. If the reaction is carried out above said temperature but below about 190° C., it is found that it is possible to obtain a product which, on cooling to ambient temperature (circa 15°-25° C.) and maintaining thereat even for prolonged periods, does not deposit solid material. However, the reaction temperature is not the only important factor. It is found that the time for which heating is carried out is important and, in general, the higher the reaction temperature, the shorter the period for which the heating can be carried out without consequences which are fatal to the storage stability of the reaction product. Illustratively, even when the reaction temperature is as low as about 60° C., it is found that there is a limited time beyond which further heating causes transformation of the pyrophosphates into what are believed to be higher polyphosphates. When the proportion of the latter in the reaction product reaches a sufficiently high level it is found that, on subsequent cooling of the reaction product, the polyphosphates separate generally as a liquid layer immiscible with the polyisocyanate. Further, the higher the reaction temperature, the shorter the period for which the reaction of acid phosphate and polyisocyanate can be allowed to continue without the onset of the above described transformation of the pyrophosphates.

The exact chemical composition of the products which separate, either when operating at a temperature less than the minimum set forth above or when heating for a period longer than that which will give rise to a homogeneous liquid product, it not known precisely and is not important to an understanding of the invention. The above discussion has been offered by way of explanation only and it is to be understood that the scope and import of the invention is not to be limited in any manner whatsoever by reason of the tentative identification of the by-products set forth above.

The time for which the process of the invention can be carried out at any given temperature within the range set forth above can vary according to the particular acid phosphate and polyisocyanate which are employed. The appropriate time in any given instance can be determined readily by a process of trial and error. In general, the reaction times which can be employed without giving rise to products which show phase separation on cooling vary from several hours at about 60° C. down to the order of a minute or less at the higher end of the temperature range. As set forth above, the higher the temperature employed, the shorter the reaction time which can be employed without deleterious results.

The manner in which the acid phosphate and the organic polyisocyanate are brought together can also, in certain cases, affect the ability to produce a storage stable composition in accordance with the invention. It is possible in many instances to bring the two reactants together, in any conventional manner, at ambient temperature and then to heat the resulting mixture at a temperature within the range set forth for a time which has been determined to give the desired result at the particular reaction temperature chosen. However, it is preferred to preheat the polyisocyanate to the selected reaction temperature and then to add the acid phosphate to the preheated polyisocyanate. When operating a batch type procedure, the addition can be carried out in a single charge or can be carried out slowly over a period of time.

The process of the invention can also be carried out in a continuous manner in which the mixture of polyisocyanate (preferably preheated) and acid phosphate is passed through a heating zone maintained at a temperature within the range set forth above. The rate of flow of mixture through the heating zone is adjusted so that the residence time in the mixing zone corresponds to the selected reaction time. A wide variety of conventional apparatus can be employed for this purpose. Particularly useful apparatus is that of the type in which the mixture to be heated is spread in the form of a thin film over the walls of the heating vessel. A typical example of such apparatus is that set forth in U.S. Pat. No. 2,927,634. In another embodiment the polyisocyanate (preferably preheated) and the acid phosphate are charged continuously, in the appropriate proportions, to a stirred reactor in which the contents are maintained at the desired temperature. Reaction mixture is withdrawn from the reactor at the same rate as the fresh reactants are added and the rate of addition and withdrawal are such that the residence time of the mixture in the reactor corresponds to the selected reaction time.

Whether the process of the invention is carried out in a batch or continuous manner, it is desirable that the reaction be carried out in the absence of oxygen and moisture, i.e. in the presence of an inert gas such as nitrogen in accordance with the usual practice of handling polyisocyanates.

The proportions in which the polyisocyanate and the acid phosphates (I) and or (II) are employed in the process of the invention can vary over a wide range but advantageously the acid phosphate is employed in an amount corresponding to about 1 to about 20 parts by weight per 100 parts by weight of polyisocyanate. In a preferred embodiment the amount of acid phosphate employed is such that the polyisocyanate compositions produced in accordance with the invention contain from about 0.1 to about 3 percent by weight of phosphorus.

The polyisocyanates employed in the process of the invention can be any organic polyisocyanate which contains at least two isocyanate groups per molecule. Illustrative of organic polyisocyanates are diphenylmethane diisocyanate, m- and p-phenylene diisocyanates, chlorophenylene diisocyanate, $\alpha,\alpha'$-xylylene diisocyanate, 2,4- and 2,6-toluene diisocyanate and the mixtures of these latter two isomers which are available commercially, triphenylmethane triisocyanates, 4,4=-diisocyanatodiphenyl ether, and polymethylene polyphenyl polyisocyanates. The latter polyisocyanates are mixtures containing from about 25 to about 90 percent by weight of methylenebis(phenyl isocyanate) the remainder of the mixture being polymethylene polyphenyl polyisocyanates of functionality higher than 2.0. Such polyisocyanates and methods for their preparation are well-known in the art; see, for example, U.S. Pat. Nos. 2,683,730; 2,950,263; 3,012,008 and 3,097,191.

These latter polyisocyanates are also available in various modified forms. One such form comprises a polymethylene polyphenyl polyisocyanate as above which has been subjected to heat treatment, generally at temperatures from about 150° C. to about 300° C., until the viscosity (at 25° C.) has been increased to a value within the range of about 800 to 1500 centipoises. Another modified polymethylene polyphenyl polyisocyanate is one which has been treated with minor amounts of an epoxide to reduce the acidity thereof in accordance with U.S. Pat. No. 3,793,362. The polymethylene polyphenyl polyisocyanates can also be employed in the form of prepolymers and quasi-prepolymers, i.e. the products obtained by reacting the polyisocyanate with a minor amount of a polyol, as well as in the form of polyisocyanates which have been partially blocked by reaction with a monohydric alcohol using procedures well-known in the art.

The polymethylene polyphenyl polyisocyanates are the preferred polyisocyanates for use in the process and compositions of the invention. Particularly preferred polymethylene polyphenyl polyisocyanates are those which contain from about 35 to about 65 percent by weight of methylenebis(phenyl isocyanate).

While any of the acid phosphates of formulae (I) and (II) can be employed in the process of the invention, those acid phosphates wherein R represents alkyl or alkenyl and X represents O, and more particularly, those acid phosphates wherein R represents alkyl or alkenyl having from 8 to 18 carbon atoms and X represents O, exhibit advantages because of ready availability and low cost.

The liquid, storage-stable, polyisocyanate compositions prepared in accordance with the process of this invention are particularly useful as binder resins for use in the preparation of particle boards in accordance with methods well-known in the art; see supra. The compositions of this invention possess the advantage of preventing adherence of the particle board to the caul plates of the press used in the preparation of the latter. For this particular use, i.e. as binder resins for particle board, it is desirable (but not essential) that the polyisocyanate compositions of the invention have a viscosity in the range of about 100 to about 3000 cps. to facilitate ease of handling in the equipment currently employed in the manufacture of particle board. Viscosities in the above range can be attained readily when employing polymethylene polyphenyl polyisocyanates having an initial viscosity of the order of about 25 cps. to about 1000 cps. and subjecting these polyisocyanates to the process of the invention. This represents an additional reason for employing such polyisocyanates in a preferred embodiment of the invention.

Where the polyisocyanate compositions of the invention are to be employed as binder resins in the preparation of particle boards and the like it is frequently the case that the polyisocyanate composition will be applied to the particle board chips, prior to heating and pressing of the latter, in the form of an aqueous emulsion or dispersion. In order to facilitate the formation of the latter it is desirable to employ an emulsifying or dispersing agent. If desired, the latter agent can be incorporated into the polyisocyanate compositions of the invention so as to enable the particle board manufacturer to prepare the required emulsion or dispersion without the need to employ additional agents. Accordingly, in an optional embodiment of the invention, the polyisocyanate compositions of the invention can have incorporated therein an emulsifying or dispersing agent. The latter can be any of those known in the art including anionic and nonionic emulsifying and dispersing agents. Illustrative of such agents are polyoxyethylene and polyoxypropylene alcohols and block copolymers of two or more of ethylene oxide, propylene oxide, butylene oxide, and styrene; alkoxylated alkylphenols such as nonylphenoxypoly(ethyleneoxy)ethanols; alkoxylated aliphatic alcohols such as ethoxylated and propoxylated aliphatic alcohols containing from about 4 to 18 carbon atoms; glycerides of saturated and unsaturated fatty acids such as stearic, oleic, and ricinoleic acids and the like; polyoxyalkylene esters of fatty acids such as stearic, lauric, oleic and like acids; fatty acid amides such as the dialkanolamides of fatty acids such as stearic, lauric, oleic and like acids. A detailed account of such materials is found in Encyclopedia of Chemical Technology, Second Edition, Vol. 19, pp. 531–554, 1969, Interscience Publishers, New York.

The acid phosphates of the formulae (I) and (II) are, for the most part, well-known in the art, and can be prepared by methods well-known in the art. Illustratively, the acid phosphates (I) and (II) are obtained by reaction of the corresponding alcohol or thiol R—XH, wherein R and X are as hereinbefore defined, with phosphorus pentoxide or phosphorus oxysulfide using the procedures described by Kosolapoff, Organophosphorus Compounds, pp. 220–221, John Wiley and Sons, Inc., New York, 1950. This reaction gives rise to a mixture of the mono- and di-acid phosphate which mixture can be separated, if desired, for example by fractional crystallization of the barium and like salts as described in the above cited reference. The individual acid phosphates, or the mixture of the mono- and di-acid phosphates obtained in accordance with the above reaction, can be employed as starting materials in the process of the invention.

The following examples describe the manner and process of making and using the invention and set forth the best mode contemplated by the inventors of carrying out the invention but are not to be construed as limiting.

EXAMPLE 1

A series of reactions were carried out using as the acid phosphate a mixture of mono- and di-lauryl acid phosphate (Tryfac 5573: Emery Industries) and as the polyisocyanate a polymethylene polyphenyl polyisocyanate containing approximately 46.5 percent by weight of methylenebis (phenyl isocyanate) and having an isocyanate equivalent of 134.5 and a viscosity of 25° C. of 173 cps. In each instance 100 parts by weight of the polyisocyanate was heated to a preselected temperature and 7 parts by weight of the acid phosphate was added dropwise over a period of 30 minutes. The resulting mixture was then maintained at the preselected temperature for a preselected period (see Table I below) and was then cooled rapidly to room temperature (circa 20° C.) and maintained thereat for several months. The reaction conditions and results are summarized in Table I from which it will be seen that the samples prepared using reaction temperatures of 60° and 100° C. for a period of two hours were not storage stable, whereas the other samples remained liquid for the duration of the storage test without showing any separation of phases. The sample made at 100° C. became turbid on cooling and separated into the two liquid phases within a very short time thereafter.

TABLE I

| Run | Reaction time | Reaction temp. | Initial Viscosity of Product 25° C. cstk. | Behaviour of Product |
|---|---|---|---|---|
| 1 | 2 hr. | 60° C. | 390 | Solids deposited |
| 2 | 6 hr. | 60° C. | 337 | Remained liquid |
| 3 | 2 hr. | 80° C. | 420 | Remained liquid |
| 4 | 7.5 hr. | 70° C. | 530 | Remained liquid |
| 5 | 4 hr. | 100° C. | 559 | Formed 2 liquid phases |

EXAMPLE 2

Using the same reactants and proportions as in Example 1 but employing in each instance a reaction temperature of 80° C., preheating the polyisocyanate to that temperature and adding the acid phosphate thereto over a preselected period of time, a series of runs was carried out to illustrate the effect of reaction time on the properties of the reaction product. The reaction conditions and results are recorded in Table II.

TABLE II

| Run | Addition time of phosphate | Reaction time (hr.) | Initial Viscosity 25° C. cstk. | Stability of Product |
|---|---|---|---|---|
| 6 | 2 minutes | 2 | 418 | Remains liquid |
| 7 | 5 seconds | 3 | 401 | Remains liquid |
| 8 | 15 minutes | 5 | 477 | Remains liquid |
| 9 | 15 minutes | 6 | 610 | Remains liquid |

TABLE II-continued

| Run | Addition time of phosphate | Reaction time (hr.) | Initial Viscosity 25° C. cstk. | Stability of Product |
|---|---|---|---|---|
| 10 | 15 minutes | 23 | 776 | separates: two liquid phases |

EXAMPLE 3

Using the procedure and the reactants set forth in Example 1 but employing a reaction temperature of 100° C. and a reaction time of 15 minutes, there was obtained a polyisocyanate composition which showed no signs of phase separation after standing for several months at room temperature. This is in direct contrast to run 5 shown in TABLE I of Example 1 which differed from the present run only in the longer reaction time of 4 hours.

EXAMPLE 4

A series of three runs was carried out using as the polyisocyanate a polymethylene polyphenyl polyisocyanate containing approximately 31 percent by weight of methylenebis(phenyl isocyanate) and having an isocyanate equivalent of 139 and a viscosity at 25° C. of 700 cps. In each run the polyisocyanate (100 parts by weight) was preheated to 80° C. and the lauryl acid phosphate (same as Example 1; amount used is shown in TABLE III) was added thereto over a period of 10 minutes and the mixture was then heated at 80° C. for the time shown in Table III. Each of the three products so obtained was a liquid which showed no tendency to separate into two phases on standing for several months.

TABLE III

| Run | Parts by wt. of phosphate | Reaction time (hr.) | Initial Viscosity of product 25° C. cstk. |
|---|---|---|---|
| 11 | 5 | 1.5 | 890 |
| 12 | 7 | 2 | 1717 |
| 13 | 10 | 2 | (N.T.) |

EXAMPLE 5

A series of runs was carried out using the same polyisocyanate as that described in Example 1 but using a variety of different acid phosphates, each of which was employed in an amount which gave a final product containing 0.57 percent by weight of phosphorus. In each run the polyisocyanate was preheated to 80° C. and the acid phosphate was added thereto with stirring over a period of 15 minutes. The resulting mixture was heated at 80° C. for 2 hours before being cooled to ambient temperature (circa 20° C.). The product obtained in each case was a liquid which showed no signs of phase separation on being stored at ambient temperature for several months. The identity of the various acid phosphates used, the amount used, and the initial viscosity of the reaction product are recorded in TABLE IV.

TABLE IV

| Run | Acid phosphate | Wt. % of acid phosphate | Initial Viscosity Product 25° cstk. |
|---|---|---|---|
| 14 | Tryfac 610A[1] | 14.3 | 682 |
| 15 | Tryfac 525A[2] | 13.6 | 1018 |
| 16 | Tryfac 325A[3] | 10.6 | 530 |

TABLE IV-continued

| Run | Acid phosphate | Wt. % of acid phosphate | Initial Viscosity Product 25° cstk. |
|---|---|---|---|
| 17 | Fosterge A2523[4] | 9.7 | 395 |
| 18 | Fosterge R[5] | 4.6 | 350 |
| 19 | Textilana[6] | 6.9 | 412 |

Footnotes:
[1]Mixture of mono- and di-decylpolyoxyethylene acid phosphates: Emery Industries.
[2]Mixture of mono- and di-dodecylpolyoxyethylene acid phosphates: Emery Industries.
[3]Mixture of mono- and di-dodecylpolyoxyethylene acid phosphates: Emery Industries.
[4]Mixture of mono- and di-dodecylpolyoxyethylene acid phosphates: Textilana Division of Henkel Inc., Hawthorne, California.
[5]Mixture of mono- and di-octyl acid phosphates: Textilana, ibid.
[6]Mixture of mono- and di-tridecyl acid phosphates: Textilana, ibid.

We claim:

1. A process for preparing a [liquid, storage-stable, polyisocyanate composition containing a mold release agent formed in situ which process comprises] *particle board wherein particles of organic material capable of being compacted are contacted with a polyisocyanate binder composition containing an internal release agent and the treated particles are subsequently formed into boards by the application of heat and pressure, the process being characterized in that the polyisocyanate binder composition has been prepared by* heating at a temperature in the range of about 60° C. to about 190° C. a mixture of an organic polyisocyanate and from about 1 to about 20 parts, per 100 parts by weight of said polyisocyanate, of an acid phosphate selected from the class consisting of acid phosphates having the formulae

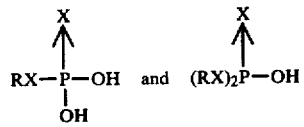

and mixtures of two or more of said acid phosphates wherein, in the above formulae, each R is independently selected from the class consisting of alkyl having at least 3 carbon atoms, alkenyl having at least 3 carbon atoms, aryl, aryl substituted by at least one alkyl group, alkyl substituted by at least one acyloxy group wherein the acyl group is the residue of an aliphatic monocarboxylic acid having at least 2 carbon atoms and

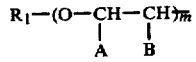

wherein $R_1$ is selected from the group consisting of alkyl, aryl and aryl substituted by at least alkyl, one of A and B represents hydrogen and the other is selected from the class consisting of hydrogen, methyl, chloromethyl and 2,2,2-trichloroethyl; X is a chalogen selected from the class consisting of oxygen and sulfur; and m is a number having an average value of 1 to 25; the said heating of said mixture being carried out for a time such that no phase separation occurs upon cooling the reaction mixture to ambient temperature.

2. A process according to claim 1 wherein the organic polyisocyanate is a mixture of polymethylene polyphenyl polyisocyanates containing from about 25 to about 90 percent by weight of methylenebis(phenyl isocyanate), the remainder of said mixture being oligomeric polymethylene polyphenyl polyisocyanates of functionality greater than 2.

3. A process according to claim 1 wherein the acid phosphate is a mixture of mono- and di-alkyl acid phosphates wherein alkyl contains at least 3 carbon atoms.

4. A process according to claim 1 wherein the acid phosphate is a mixture of mono- and di-alkenyl acid phosphates wherein alkenyl contains at least 3 carbon atoms.

5. A process according to claim 1 wherein the acid phosphate is a mixture of mono- and di-alkylpolyoxyalkylene acid phosphates wherein alkylene is selected from the class consisting of ethylene and propylene.

6. A process according to claim 1 wherein the acid phosphate is a mixture of mono- and di-arylpolyoxyalkylene acid phosphates wherein alkylene is selected from the class consisting of ethylene and propylene and said aryl group is unsubstituted or substituted by at least one alkyl group.

7. A process for preparing a [liquid, storage-stable, polyisocyanate composition containing a mold release agent formed in situ which process comprises] *particle board wherein particles of organic material capable of being compacted are contacted with a polyisocyanate binder composition containing an internal release agent and the treated particles are subsequently formed into boards by the application of heat and pressure, the process being characterized in that the polyisocyanate binder composition has been prepared by* heating, at a temperature in the range of about 60° C. to about 190° C., a mixture of (a) a mixture of polymethylene polyphenyl polyisocyanates containing from about 25 to about 90 percent by weight of methylenebis(phenyl isocyanate), the remainder of said mixture being oligomeric polymethylene polyphenyl polyisocyanates of functionality greater than 2; and (b) from about 1 to about 20 parts, per 100 parts by weight of polyisocyanate, of an acid phosphate selected from the class consisting of acid phosphates having the formulae

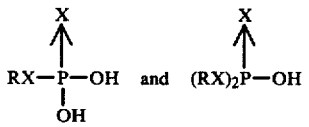

and mixtures of two or more of said acid phosphates;

wherein, in the above formulae, each R is independently selected from the class consisting of alkyl having at least 3 carbon atoms, alkenyl having at least 3 carbon atoms, aryl, aryl substituted by at least one alkyl group, alkyl substituted by at least one acyloxy group wherein the acyl group is the residue of an aliphatic monocarboxylic acid having at least 2 carbon atoms and

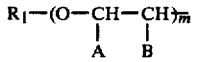

wherein $R_1$ is selected from the group consisting of alkyl, aryl and aryl substituted by at least one alkyl, one of A and B represents hydrogen and the other is selected from the class consisting of hydrogen, methyl, chloromethyl and 2,2,2-trichloroethyl; X is a chalcogen selected from the class consisting of oxygen and sulfur; and m is a number having an average value of 1 to 25;

the said heating of said mixture being carried out for a time such that no phase separation occurs upon cooling the reaction mixture to ambient temperature.

8. A process according to claim 7 in which the polyisocyanate is preheated to a temperature within the stated range and the acid phosphate is admixed with the said preheated polyisocyanate.

9. A process according to claim 7 or 8 in which the acid phosphate is a mixture of mono- and di-alkyl acid phosphates wherein alkyl contains at least 3 carbon atoms.

10. A process according to claim 9 wherein said mixture of mono- and di-alkyl acid phosphates is a mixture of lauryl monoacid phosphate and dilauryl acid phosphate.

11. A process according to claim 7 or 8 in which the acid phosphate is a mixture of mono- and di-alkenyl acid phosphates wherein alkenyl contains at least 3 carbon atoms.

12. A process according to claim 7 or 8 in which the acid phosphate is a mixture of mono- and di-alkylpolyoxyalkylene acid phosphates wherein alkylene is selected from the class consisting of ethylene and propylene.

13. A process according to claim 7 or 8 in which the acid phosphate is a mixture of mono- and di-aryl polyoxyalkylene acid phosphates wherein alkylene is selected from the class consisting of ethylene and propylene and said aryl group is unsubstituted or substituted by at least one alkyl group.

[14. A liquid, storage-stable, polyisocyanate composition prepared in accordance with claim 1.]

[15. A liquid, storage-stable, polyisocyanate composition prepared in accordance with claim 7.]

* * * * *

UNITED STATES PATENT OFFICE

CERTIFICATE OF CORRECTION

Patent No. Re. 31,703 Dated October 9, 1984

Inventor(s) Richard A. Prather, David L. Williams, Robert M. Partin, and Warren J. Rabourn It is certified that error appears in the above-identified patent and that said Letters Patent are hereby corrected as shown below:

On the title page;

The entry under "References Cited" "U.S. PATENT DOCUMENTS" 3,493,075 3/1970 Fishbein et al.....528/51 is a misprint and should be deleted. Column 5, line 13 "it not" should read --is not--. Column 6, line 29 "4,4=-" should read --4,4'- --. Column 10, Claim 1, line 54 "at least alkyl" should read --at least one alkyl--.

Signed and Sealed this

Eighth Day of October 1985

[SEAL]

Attest:

Attesting Officer

DONALD J. QUIGG

Commissioner of Patents and Trademarks—Designate